United States Patent
Fitzer et al.

(10) Patent No.: US 10,798,183 B2
(45) Date of Patent: Oct. 6, 2020

(54) TUNNELING PROTCOL AND GATEWAY FOR DISTRIBUTED COMPUTING ENVIRONMENTS

(71) Applicant: SAP SE, Walldorf (DE)

(72) Inventors: Joachim Fitzer, Schriesheim (DE); Pietro Francesco Menna, São Leopoldo (BR); Felipe Musse, Porto Alegre (BR); Simon Seif, Östringen (DE)

(73) Assignee: SAP SE, Walldorf (DE)

( * ) Notice: Subject to any disclaimer, the term of this patent is extended or adjusted under 35 U.S.C. 154(b) by 90 days.

(21) Appl. No.: 16/218,794

(22) Filed: Dec. 13, 2018

(65) Prior Publication Data
US 2020/0195728 A1 Jun. 18, 2020

(51) Int. Cl.
*H04L 29/08* (2006.01)
*H04L 12/46* (2006.01)
*H04L 29/06* (2006.01)

(52) U.S. Cl.
CPC ........ *H04L 67/141* (2013.01); *H04L 12/4633* (2013.01); *H04L 67/02* (2013.01); *H04L 67/10* (2013.01); *H04L 67/327* (2013.01); *H04L 69/08* (2013.01); *H04L 69/329* (2013.01)

(58) Field of Classification Search
CPC ..... H04L 12/4633; H04L 67/02; H04L 67/10; H04L 67/141; H04L 67/327; H04L 69/329

See application file for complete search history.

(56) References Cited

U.S. PATENT DOCUMENTS

| | | | |
|---|---|---|---|
| 7,720,826 B2 | 5/2010 | Fitzer et al. | |
| 7,865,606 B1 | 1/2011 | Tewes et al. | |
| 7,908,589 B2 | 3/2011 | Sattler et al. | |
| 8,255,429 B2 | 8/2012 | Lange et al. | |
| 8,312,416 B2 | 11/2012 | Freund et al. | |
| 8,510,373 B2 | 8/2013 | Demant et al. | |
| 8,516,364 B2 | 8/2013 | Demant et al. | |
| 8,544,027 B2 | 9/2013 | Demant et al. | |
| 8,555,249 B2 | 10/2013 | Demant et al. | |
| 8,566,452 B1 * | 10/2013 | Goodwin, III | H04L 63/0281 709/227 |
| 8,589,883 B2 | 11/2013 | Demant et al. | |
| 8,612,927 B2 | 12/2013 | Brunswig et al. | |

(Continued)

*Primary Examiner* — Thomas J Dailey
(74) *Attorney, Agent, or Firm* — Fish & Richardson P.C.

(57) ABSTRACT

Techniques are described for managing communications with applications executing in a distributed computing environment, through use of a tunneling protocol that is employed by a client-side gateway and a server-side application router to enable client-server communications that would not otherwise be supported within the distributed computing environment. A cloud computing service may enforce network security policies, such as restricting network traffic to and from its hosted applications to use an application layer protocol such as a version of Hypertext Transfer Protocol (HTTP), which may not be feasible for legacy applications and/or applications of a particular type or domain. The implementations described herein provide a mechanism that supports the deployment and operation of an application in a cloud computing environment, where such an application may employ any suitable communication protocol that may not be supported by the environment.

20 Claims, 4 Drawing Sheets

(56) References Cited

U.S. PATENT DOCUMENTS

| | | |
|---|---|---|
| 8,694,544 B2 | 4/2014 | Demant et al. |
| 8,868,582 B2 | 10/2014 | Fitzer et al. |
| 8,881,056 B2 | 11/2014 | Demant et al. |
| 8,930,441 B2 | 1/2015 | Demant et al. |
| 9,137,262 B2* | 9/2015 | Qureshi ............ H04W 12/0806 |
| 9,171,039 B2 | 10/2015 | Teichmann et al. |
| 9,253,159 B2* | 2/2016 | Chauhan ............ H04L 63/0272 |
| 9,282,111 B1* | 3/2016 | Wei .................... H04L 63/1408 |
| 9,491,238 B2 | 11/2016 | Demant et al. |
| 2005/0010816 A1* | 1/2005 | Yu ...................... H04L 63/0272 |
| | | 726/4 |
| 2012/0023421 A1 | 1/2012 | Demant et al. |
| 2012/0030664 A1 | 2/2012 | Demant et al. |
| 2012/0054602 A1 | 3/2012 | Demant et al. |
| 2012/0297066 A1* | 11/2012 | Hewett .................. H04L 67/10 |
| | | 709/226 |
| 2013/0166675 A1 | 6/2013 | Giebel et al. |
| 2015/0101043 A1* | 4/2015 | Clifton .................. H04L 67/14 |
| | | 726/22 |
| 2020/0153719 A1* | 5/2020 | Chauhan ................ H04L 67/22 |

* cited by examiner

TUNNELING PROTCOL AND GATEWAY FOR DISTRIBUTED COMPUTING ENVIRONMENTS

BACKGROUND

Given the ubiquity of computing devices of various types of uses, entities have access to increasing volumes of data of various types, which may be generated in high volume. Such data can be produced by various types of source devices, such as computers, sensors, internet-of-things (IoT) (e.g., smart) devices, industrial control systems, and so forth. The data can be of different types and/or formats, such as process log files, images, videos, location or navigation data, sentiment data from social media, and so forth. Entities seek to mine or otherwise exploit this data to determine patterns, insights, opportunities, and so forth, which can provide a competitive advantage and/or other benefits. Further, various distributed computing environments provide services for hosting such "big data" and/or applications that can operate to analyze, manage, and otherwise handle the data. Such distributed computing environments are also described as cloud computing environments, and often impose restrictions on the types of applications can be hosted to run within the distributed computing environment, and/or limitations on the technical specifications of the hosted applications.

SUMMARY

Implementations of the present disclosure are generally directed to the management of communications involving applications executing in a distributed computing environment. More particularly, implementations of the present disclosure are directed to a tunneling protocol and gateway, and an application router, that support the execution of a server-side application on a distributed computing environment, by managing communications between the server-side application and a client-side application. For example, implementations can enable communications between applications that are configured to use a communication protocol that may not be supported by the distributed computing environment where the server-side application is to be executed.

In general, implementations of innovative aspects of the subject matter described in this specification can be embodied in a method that includes the following operations: receiving, at an application router executing in a distributed computing environment, a request from a gateway executing on a client computing device, wherein the request is to initiate communications between a client application executing on the client computing device and a server application that is associated with the client application and hosted by the distributed computing environment, wherein the client application and the associated server application are configured to use a first communication protocol that is not supported by the distributed computing environment; based on determining, by the application router, that an available instance of the server application is not already executing in the distributed computing environment, launching the instance of the server application to execute in the distributed computing environment; and forwarding, by the application router, communications from the instance of the server application to the gateway and from the gateway to the instance of the server application, using a second communication protocol that is supported by the distributed computing environment.

These and other implementations can each optionally include one or more of the following innovative aspects: the operations further include based on determining, by the application router, that an available instance of the server application is already executing in the distributed computing environment, employing the available instance of the server application for communications with the client application; the client application is a client-side component of a client-server application; the server application is a server-side component of the client-server application; the second communication protocol is a version of Hypertext Transfer Protocol (HTTP); the second communication protocol is an application layer protocol, and the first communication protocol is not an application layer protocol; the application router forwards the communications based on routing information which associates the client application with the instance of the server application; the operations further comprising updating, by the application router, the routing information to indicate the instance of the server application to be employed for communications with the client application; and/or the application router forwards communications between each of a plurality of gateways, executing on different client computing devices, and a respective instance of a server application executing on the distributed computing environment.

Other implementations of any of the above aspects include corresponding systems, apparatus, and/or computer programs that are configured to perform the operations of the methods. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
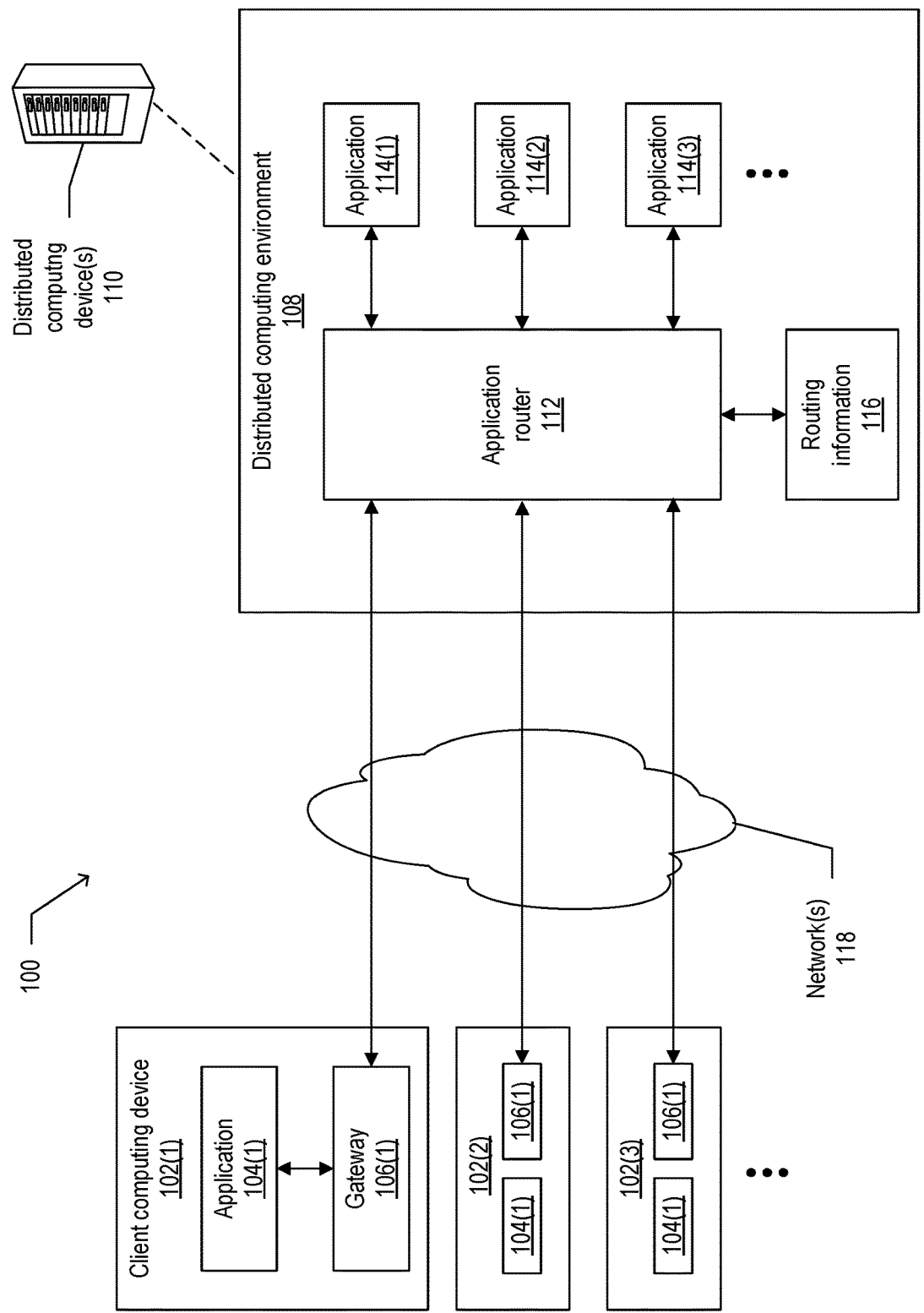
FIG. 1 depicts an example system for managing communications between a client-side application and a server-side application, according to implementations of the present disclosure.

Implementations of the present disclosure are directed to techniques for managing communications with applications executing in a distributed computing environment, through use of a tunneling protocol that is employed by a client-side gateway and a server-side application router to enable client-server communications that would not otherwise be supported within the distributed computing environment.

In cloud computing scenarios, the computing device that is handling a client request is typically physically separated from the client computing device. To enable communication between the client device and the server-side device, cloud computing services can employ any suitable wide area network (WAN) such as the Internet. In some examples, companies that provide the cloud computing service may enforce network security policies that operate in a way that is contrary to the general-purpose usability of WANs. For example, traditionally a cloud service may restrict network traffic to and from its hosted applications, by requiring such communications to be over the application layer, using a (e.g., layer 7) protocol such as a version of Hypertext Transfer Protocol (HTTP). Accordingly, in such traditional environments a hosted application may be required to be accessible via HTTP. In many instances, this restriction may not be desirable to those seeking to run an application in the environment, for example if the allowed protocol is not suitable for the domain of the application. The restriction also may not be feasible for (e.g., legacy) applications that may be built to use non-application layer (e.g., lower-level than layer 7) communication protocols, such as applications that may predate HTTP. The implementations described herein provide a mechanism that supports the deployment and operation of an application in a cloud computing environment, where such an application may employ any suitable communication protocol that may not be supported by the environment.

In some examples, the application may be arranged according to a client/server architecture. For example, the application can include client-side component(s) that execute on a client computing device and that communicate with server-side component(s) of the application executing in the distributed computing environment.

In some implementations, the distributed computing environment operates as part of a data management solution (e.g., a data hub), such as the SAP Data Hub™. The data hub can provide various orchestration and data pipelining capabilities to receive and handle data from various types of data sources, such as databases (e.g., SAP HANA™) Hadoop™, internet-of-things (IoT) platforms, data warehouses (e.g., SAP BW™), social networks, and so forth. In some examples, users such as data engineers and/or others may use the implementations described herein to handle the orchestration of data into a data management platform. The distributed computing environment may also be described as a cloud computing environment, or a cloud environment. Various types of applications may be hosted by the distributed computing environment, and execute within the environment. In some examples, an application may be hosted (e.g., as a software-as-a-service (SaaS) offering) in a cloud environment.

FIG. 1 depicts an example system 100 for managing communications between a client-side application 104 and a server-side application 114, according to implementations of the present disclosure. As shown in the example of FIG. 1, the system 100 can include any suitable number of client computing devices 102. The device(s) 102 can each be any suitable type of computing device. The system 100 can also include one or more distributed computing devices 110 that provide a distributed computing environment 108 (e.g., a cloud computing environment). The device(s) 102 can communicate with the distributed computing environment 108 over one or more networks 118. The network(s) 118 can include wired or wireless networks. In some examples, the network(s) 118 include one or more WANs such as the Internet.

A client device 102 can execute an application 104, also described herein as a client application or a client-side application. The application 104 can be any suitable type of application. In some examples, the client application 104 is a client-side component of a client-server application, and is associated with a server-side component of the client-server application (e.g., the server application 114) that is hosted by and executable on the distributed computing environment 108. The client application 104 may also be any other suitable type of application that is associated with the server application 114, and that is configured to communicate with the server application 114. In some instances, the client application 104 and server application 114 are configured to communicate with each other using a communication protocol that is not supported by the distributed computing environment 108. For example, the distributed computing environment 108 may be configured to host applications 114 that communicate using a version of HTTP or some other protocol that operates at the application layer, e.g., layer 7 of the Open Systems Interconnection (OSI) model for network communications.

A client device 102 can execute a gateway 106, which communicates (e.g., using HTTP or some other supported protocol) with an application router 112 executing on the distributed computing environment 108. The gateway 106 and the application router 112 can operate as intermediaries to mediate the communications between the application 104 an associated instance of the application 114 executing on the distributed computing environment 108.

In some implementations, the application router 112 handles the forwarding of communications between different client device gateways 106 and different instances of server-side applications executing on the distributed computing environment 108. To determine where to route the communications, the application router 112 can employ routing information 116 that is stored on the distributed computing environment 108 or elsewhere. The routing information 116 can be a table or other suitable data structure that stores an association between the client application 104 and the particular instance of the application 114 that the client application 104 is communicating with (via the gateway and application router). The application router 112 can use the information in the routing information 116 to determine which particular server-side application instance is to receive the incoming traffic from a particular client application 104, and similarly which particular gateway is to receive outgoing traffic from a particular server-side application instance.

In some implementations, the application router 112, on receiving a request to mediate communications between a client application 104 and a server application 114, may determine whether a suitable instance of the server application 114 is already executing on the distributed computing environment 108 and is not already being employed to handle requests from another client application. If an instance is already executing and is available, the application router 112 may employ that executing instance to handle the communications from the newly requesting client application 104. If a suitable instance is not already executing on the distributed computing environment 108, the application router 112 may launch the instance and use it to handle communications with the client application 104.

In this way, implementations may provide what can be described as a two-part solution in situations where the server-side of a client-server application (e.g., a legacy application) is to execute on a distributed computing environment, but the application is configured to communicate using a protocol that is not supported by the distributed computing environment. The gateway 106 is executed on the client-side computer 102. In some instances, the network within this device 102 is trusted, such that no firewall is operating on the device 102. The gateway 106 can initiate a connection to the application router 112 executing on the distributed computing environment. In some instances, the network within the distributed computing environment is also trusted, such that no firewall is operating on the environment 108. The connection between the gateway 106 and application router 112 can utilize a (e.g., de facto, everywhere allowed) network protocol such as a version of HTTP. Accordingly, the connection may be unaffected by any firewall which happens to operate between the gateway 106 and the application router 112 in the network topology.

In some implementations, the gateway 106 is started on the device 102 with the following parameters: the application router 112 instance it is to connect with; credentials (e.g., user credentials) to use to authenticate against the application router 112; an identifier for the target server-side application 114; and/or a transmission control protocol (TCP) port number corresponding to the unsupported protocol that the client-server application is configured to use (e.g., the protocol that is not supported by the cloud environment).

The gateway can connect to the application router 112, authenticate itself using the provided credentials, and request that the application router 112 open a connection to an instance of the server-side application 114 using the unsupported protocol. The gateway can also allow maintain a connection locally on the client device 102 to the application 104, using the unsupported protocol. The client application 104 can be configured to communicate with the gateway 106 instead of with the application 114 directly using the unsupported protocol. The gateway 106 can forward network communications from the client-side application 104 to the application router 112 via the supported protocol (e.g., HTTP), and the application router 112 can in turn forward the communications to the server-side application 114 using the unsupported protocol.

Because implementations handle the forwarding using the unsupported protocol on both client-side and server-side to the application 104 and the application 114, the intermediation may be described as transparent to the client-side application 104 and the server-side application 114, given that either application may not require any modification to enable the intermediation of the communications by the gateway 106 and the application router 112.

As described above, in some examples the distributed computing environment 108 is a data hub environment for handling large amounts of data and for hosting application to process the data. The data hub can also include any suitable number of data hub operators that each enable the data hub to receive data from a particular type of data source. The data sources can include, but are not limited to, IoT systems, database(s), and/or other data sources such as social media platforms, data warehouses, and so forth. In some instances, the data source(s) can provide data according to an OpenAPI format. Examples of data hub operators to achieve this can include Kafka™ (e.g., to help cross technology boundaries) and the data hub Open API REST client. The data hub SAP HANA™ client can also be used for HANA™ data sources. In some examples, the distributed computing environment can interact with a separate (e.g., enterprise) computing environment, which can employ various suitable technologies such as SAP S/4HANA™, Hybris™, and so forth.

In some examples, the (e.g., SAP) data hub is a data sharing, pipelining, and orchestration solution that helps accelerate and expand the flow of data across diverse data landscapes. The software solution leverages a distributed computing platform to enable an enterprise data lake, e.g., a view of all the company data encompassing structured enterprise master data with diverse and unstructured big data. It also provides support for a large variety of data systems such as Hadoop, SAP HANA, SLT, and so forth, which can be used for the creation of organization-spanning data processing pipelines. A data hub may be extensible by design.

Figure 2:
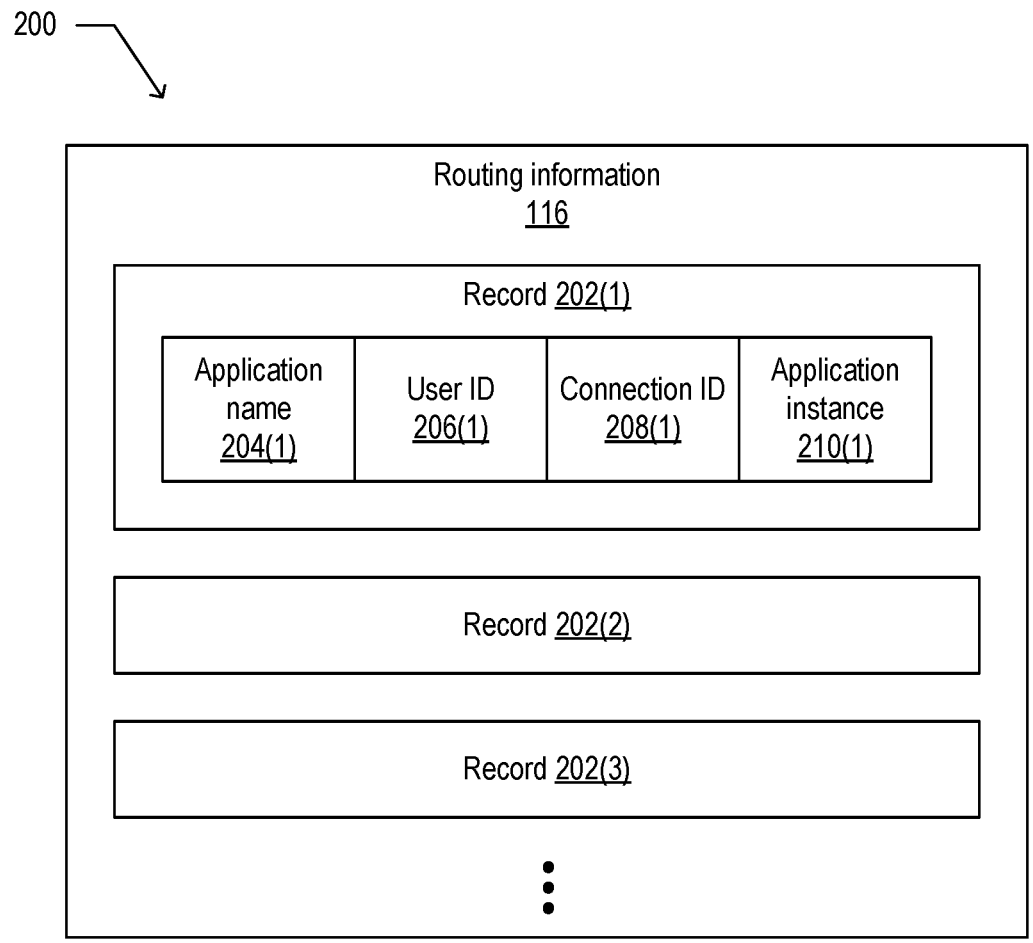
FIG. 2 depicts example routing information, according to implementations of the present disclosure.

FIG. 2 depicts a schematic 200 of example routing information 116, according to implementations of the present disclosure. As shown in this example, the routing information 116 can be a table or other suitable data structure that includes one or more records 202. Each record can include: an application name 204 (e.g., the name of the client-side application); a user identifier (ID) 206 identifying the user of the client device 102 and/or the client application 104; a connection ID 208 which uniquely identifies the connection established between the client-side application and the server-side application (e.g., via the gateway and application router); and an application instance 210 indicating the instance of the server-side application being employed in this connection with the client-side application.

Table 1 shows an example of routing information 116 that may be employed in some implementations.

TABLE 1

| Application Name | User ID | Connection ID | Application Instance |
|---|---|---|---|
| A | User1 | C1 | A1 |
| B | User1 | C2 | B1 |
| A | User2 | C3 | A2 |

The distributed computing environment 108 can run any suitable number of instances of applications 114, for any number of applications 114 of any suitable type. In some examples, the environment 108 can run on top of a public cloud, such as that provided by Amazon™, Google™, VMWare™, SAP™ and so forth. The client-server application may be enterprise software (e.g., legacy software) executing in a business environment, and in some instances the corporate network may be secured using firewalls or other mechanisms which may make it difficult to establish a connection to public network(s) outside the corporate network. Traditionally, such network traffic may be required to go through an HTTP proxy, which means the transmitted data may be limited to HTTP data. This restriction conflicts with the general idea that any type of application should be executable in the cloud environment. In some examples, such a restriction prevents applications from running in the cloud if the applications do not support the cloud-required protocol, such as HTTP, such as legacy applications.

The implementations described herein can be usable with any suitable cloud environment, to provide a mechanism by which a wide range of applications can be run on the cloud environment even if the applications do not natively support the communication protocol required by the cloud environment. The client-side gateway 106 operates as an intermediary between the client-side (e.g., legacy) application and the application router 112 executing on the server-side. The gateway 106 can be employed to proxy (e.g., forward and/or tunnel) a certain TCP port number that the client-side application is using to a localhost and effectively proxy the traffic that the client application is sending. The gateway can intercept the traffic on the specified port and forward the traffic to the server-side application router 112. On the server-side, the application router 112 fulfills a similar role but in a reverse order, by intercepting traffic from the server-side application 114 and forwarding it on to the gateway 106 to be subsequently sent to the client-side application 104.

The gateway 106 can connect to the application router 112 over the supported protocol (e.g., HTTP). Communications from the gateway can identify which server-side application instance is to receive the traffic, and the application router 112 can route the traffic accordingly, acting as a reverse proxy. In some examples, the routing information 116 can be used by the application router 112 to determine how to route traffic to and from the server-side application 114.

Figure 3:
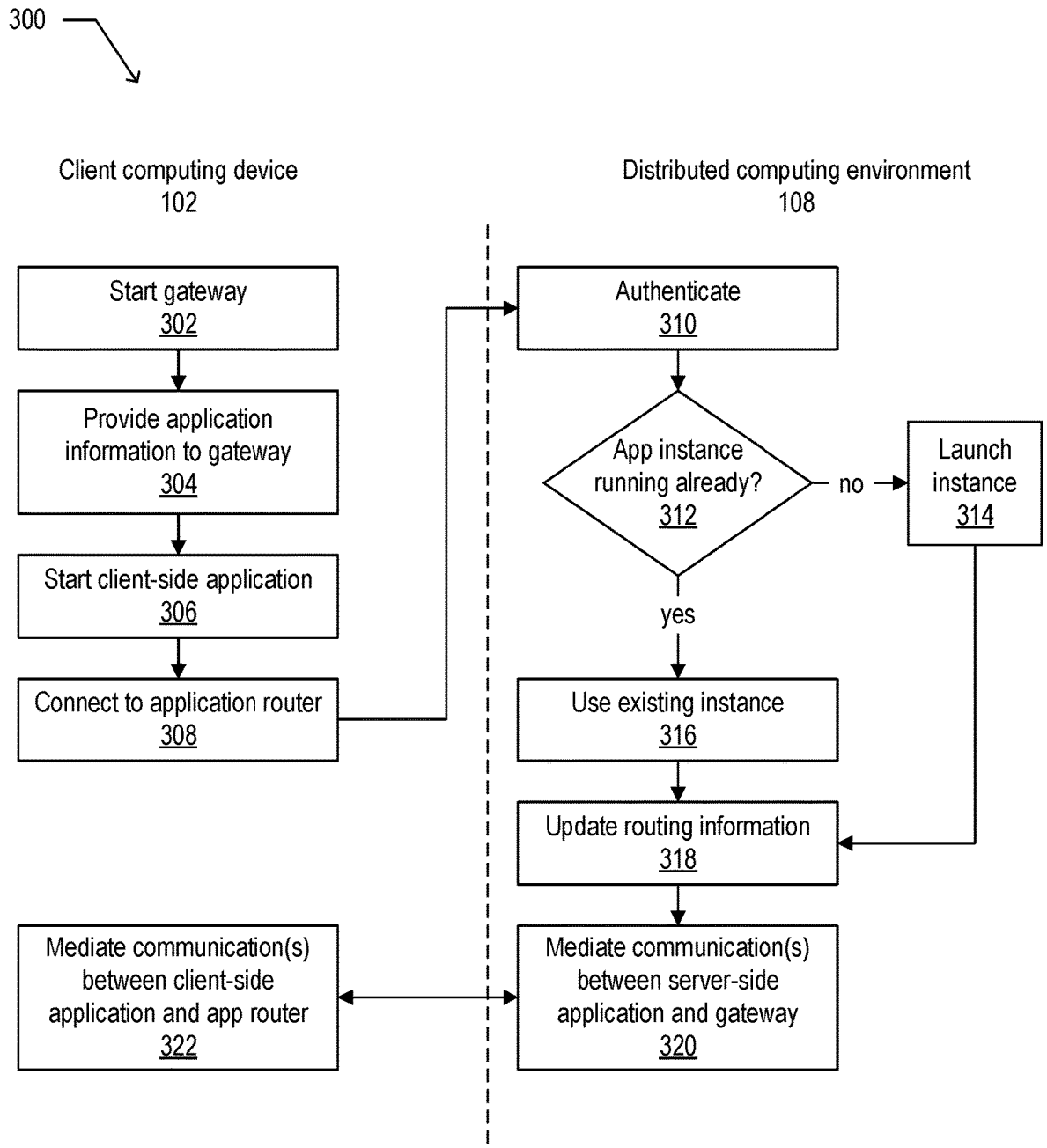
FIG. 3 depicts a flow diagram of an example process for managing communications between a client-side application and a server-side application, according to implementations of the present disclosure.

FIG. 3 depicts a flow diagram 300 of an example process for managing communications between a client-side application 104 and a server-side application 114, according to implementations of the present disclosure. Operations of the process can be performed by one or more of the gateway 106, the application router 112, and/or other software module(s) executing on the client device 102, the distributed computing environment 108, or elsewhere.

The gateway 104 can be started (302) on the client device 102. In some implementations, the gateway 104 can be started with input parameters that include the user credentials to be used to authenticate a connection with the cloud environment.

The gateway 104 can be provided (304) with application information that specifies the connection to be established. In some examples, this can include providing a network address, on the distributed computing environment, where the application router 112 is executing. The gateway 104 can also be provided with the name of the client-side application and/or server-side application, and a port number used by the client-side application.

In some implementations, a local TCP socket under specified port can be opened by the gateway 104, which can begin listening on the opened socket. The client-side application 104 can then be started (306). In some examples, the application 104 can be started and pointed at the local TCP socket where the gateway 104 is listening (e.g., localhost: 42) instead of pointing the application 104 directly at the server-side application 114.

The gateway 104 can request a connection (308) to the application router 112. In some instances, the request may include the (e.g., user) credentials, and the application router 112 (or cloud environment) can authenticate 310 the request based on the provided credential(s) (e.g., username, password, and/or other credentials). The connection may be established if authentication succeeds.

In some implementations, the application router 112 can check (312) whether an available instance of the server-side application 114 is already executing in the cloud environment. If not, the application router 112 can launch (314) an instance to use. If a suitable instance is already running, and is not tasked with handling traffic from another client, the executing instance can be used (316). In either case, the routing information 116 can be updated (318) to reflect the instance of the server-side application 116 to be employed and associated with the client application 104, user ID, and/or connection ID as described above.

The application router 112 can then begin mediating (320) communication(s) between the server-side application 116 and the gateway 106. Such mediating can include forwarding traffic from the server-side application to the gateway, and forwarding traffic from the gateway to the associated server-side application. The gateway can similarly mediate traffic on the client-side, by forwarding traffic from the client-side application to the application router, and forwarding traffic from the application router to the client-side application.

After a client application closes (e.g., either in a controlled manner or not), an instance of the application on the server-side can continue running and/or be reused by the application router as appropriate. The server-side application may be shut down by the application router in a controlled manner as part of the typical operation of the client-server application when the client-side shuts down in a controlled manner. In some implementations, the gateway can provide a user interface (UI) that is used to launch the gateway with the appropriate startup information, and indicate the client-side application and server-side application information, port number, and/or other parameters. In some examples, the UI is a command-line UI.

The application router 112 can manage traffic between multiple pairs of client-side and server-side applications, and use the information in the routing information 116 to determine how to route the traffic for the different connections, effectively partitioning incoming and outgoing traffic among different endpoints.

Figure 4:
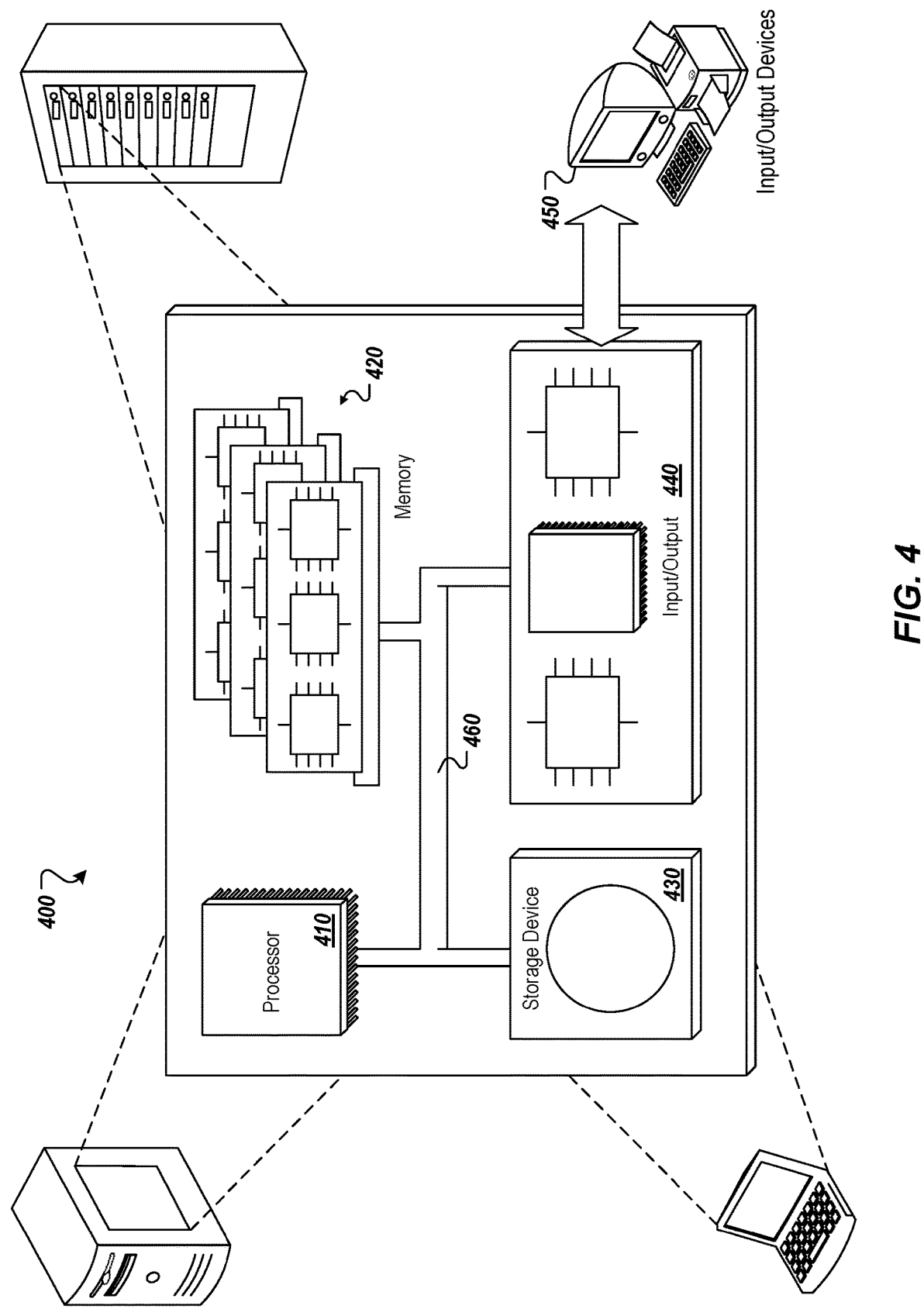
FIG. 4 depicts an example computing system, according to implementations of the present disclosure.

FIG. 4 depicts an example computing system 400, according to implementations of the present disclosure. The system 400 may be used for any of the operations described with respect to the various implementations discussed herein. For example, the system 400 may be included, at least in part, in one or more of the client device(s) 102, the distributed computing device(s) 110, and/or other computing device(s) or system(s) described herein. The system 400 may include one or more processors 410, a memory 420, one or more storage devices 430, and one or more input/output (I/O) devices 450 controllable via one or more I/O interfaces 440. The various components 410, 420, 430, 440, or 450 may be interconnected via at least one system bus 460, which may enable the transfer of data between the various modules and components of the system 400.

The processor(s) 410 may be configured to process instructions for execution within the system 400. The processor(s) 410 may include single-threaded processor(s), multi-threaded processor(s), or both. The processor(s) 410 may be configured to process instructions stored in the memory 420 or on the storage device(s) 430. For example, the processor(s) 410 may execute instructions for the various software module(s) described herein. The processor(s) 410 may include hardware-based processor(s) each including one or more cores. The processor(s) 410 may include general purpose processor(s), special purpose processor(s), or both.

The memory 420 may store information within the system 400. In some implementations, the memory 420 includes one or more computer-readable media. The memory 420 may include any number of volatile memory units, any number of non-volatile memory units, or both volatile and non-volatile memory units. The memory 420 may include read-only memory, random access memory, or both. In some examples, the memory 420 may be employed as active or physical memory by one or more executing software modules.

The storage device(s) 430 may be configured to provide (e.g., persistent) mass storage for the system 400. In some implementations, the storage device(s) 430 may include one or more computer-readable media. For example, the storage device(s) 430 may include a floppy disk device, a hard disk device, an optical disk device, or a tape device. The storage device(s) 430 may include read-only memory, random access memory, or both. The storage device(s) 430 may include one or more of an internal hard drive, an external hard drive, or a removable drive.

One or both of the memory 420 or the storage device(s) 430 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 400. In some implementations, the CRSM may include a data store that provides storage of computer-readable instructions or other information in a non-transitory format. The CRSM may be incorporated into the system 400 or may be external with respect to the system 400. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 410 and the memory 420 may be supplemented by, or incorporated into, one or more application-specific integrated circuits (ASICs).

The system 400 may include one or more I/O devices 450. The I/O device(s) 450 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 450 may also include one or more output devices such as a display, LED(s), an audio output device (e.g., a speaker), a printer, a haptic output device, and so forth. The I/O device(s) 450 may be physically incorporated in one or more computing devices of the system 400, or may be external with respect to one or more computing devices of the system 400.

The system 400 may include one or more I/O interfaces 440 to enable components or modules of the system 400 to control, interface with, or otherwise communicate with the I/O device(s) 450. The I/O interface(s) 440 may enable information to be transferred in or out of the system 400, or between components of the system 400, through serial communication, parallel communication, or other types of communication. For example, the I/O interface(s) 440 may comply with a version of the RS-232 standard for serial ports, or with a version of the IEEE 1284 standard for parallel ports. As another example, the I/O interface(s) 440 may be configured to provide a connection over Universal Serial Bus (USB) or Ethernet. In some examples, the I/O interface(s) 440 may be configured to provide a serial connection that is compliant with a version of the IEEE 1394 standard.

The I/O interface(s) 440 may also include one or more network interfaces that enable communications between computing devices in the system 400, or between the system 400 and other network-connected computing systems. The network interface(s) may include one or more network interface controllers (NICs) or other types of transceiver devices configured to send and receive communications over one or more communication networks using any network protocol.

Computing devices of the system 400 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 400 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method performed by at least one computing device that provides a distributed computing environment, the method comprising:
receiving, at an application router executing in the distributed computing environment, a request from a gateway executing on a client computing device, wherein the request is to initiate communications between a client application executing on the client computing device and a server application that is associated with the client application and hosted by the distributed computing environment, wherein a first communication protocol that is not supported by the distributed computing environment is used by the client application and the associated server application;
based on determining, by the application router, that an available instance of the server application is not already executing in the distributed computing environment, launching the instance of the server application to execute in the distributed computing environment;
intercepting, by the application router, communications from the instance of the server application using the first communication protocol and communications from the gateway using a second communication protocol that is supported by the distributed computing environment, wherein the second communication protocol is not supported by the instance of the server application; and
in response to intercepting the communications, forwarding, by the application router, the intercepted communications from the instance of the server application to the gateway using the second communication protocol and the intercepted communications from the gateway to the instance of the server application using the first communication protocol.

2. The method of claim 1, further comprising:
based on determining, by the application router, that an available instance of the server application is already executing in the distributed computing environment, employing the available instance of the server application for communications with the client application.

3. The method of claim 1, wherein:
the client application is a client-side component of a client-server application; and
the server application is a server-side component of the client-server application.

4. The method of claim 1, wherein the second communication protocol is a version of Hypertext Transfer Protocol (HTTP).

5. The method of claim 1, wherein the second communication protocol is an application layer protocol, and the first communication protocol is not an application layer protocol.

6. The method of claim 1, wherein the application router forwards the communications based on routing information which associates the client application with the instance of the server application.

7. The method of claim 6, further comprising:
updating, by the application router, the routing information to indicate the instance of the server application to be employed for communications with the client application.

8. The method of claim 1, wherein the application router forwards communications between each of a plurality of gateways, executing on different client computing devices, and a respective instance of a server application executing on the distributed computing environment.

9. A system comprising:
at least one processor; and
a memory communicatively coupled to the at least one processor, the memory storing instructions which, when executed, cause the at least one processor to perform operations comprising:
receiving, at an application router executing in a distributed computing environment, a request from a gateway executing on a client computing device, wherein the request is to initiate communications between a client application executing on the client computing device and a server application that is associated with the client application and hosted by the distributed computing environment, wherein a first communication protocol that is not supported by the distributed computing environment is used by the client application and the associated server application;
based on determining, by the application router, that an available instance of the server application is not already executing in the distributed computing environment, launching the instance of the server application to execute in the distributed computing environment;
intercepting, by the application router, communications from the instance of the server application using the first communication protocol and communications from the gateway using a second communication protocol that is supported by the distributed computing environment, wherein the second communication protocol is not supported by the instance of the server application; and
in response to intercepting the communications, forwarding, by the application router, the intercepted communications from the instance of the server application to the gateway using the second communication protocol and the intercepted communications from the gateway to the instance of the server application using the first communication protocol.

10. The system of claim 9, the operations further comprising:
based on determining, by the application router, that an available instance of the server application is already executing in the distributed computing environment, employing the available instance of the server application for communications with the client application.

11. The system of claim 9, wherein:
the client application is a client-side component of a client-server application; and
the server application is a server-side component of the client-server application.

12. The system of claim 9, wherein the second communication protocol is a version of Hypertext Transfer Protocol (HTTP).

13. The system of claim 9, wherein the second communication protocol is an application layer protocol, and the first communication protocol is not an application layer protocol.

14. The system of claim 9, wherein the application router forwards the communications based on routing information which associates the client application with the instance of the server application.

15. The system of claim 14, the operations further comprising:

updating, by the application router, the routing information to indicate the instance of the server application to be employed for communications with the client application.

16. The system of claim 9, wherein the application router forwards communications between each of a plurality of gateways, executing on different client computing devices, and a respective instance of a server application executing on the distributed computing environment.

17. One or more non-transitory computer-readable storage media storing instructions which, when executed, cause at least one processor to perform operations comprising:
   receiving, at an application router executing in a distributed computing environment, a request from a gateway executing on a client computing device, wherein the request is to initiate communications between a client application executing on the client computing device and a server application that is associated with the client application and hosted by the distributed computing environment, wherein a first communication protocol that is not supported by the distributed computing environment is used by the client application and the associated server application;
   based on determining, by the application router, that an available instance of the server application is not already executing in the distributed computing environment, launching the instance of the server application to execute in the distributed computing environment;
   intercepting, by the application router, communications from the instance of the server application using the first communication protocol and communications from the gateway using a second communication protocol that is supported by the distributed computing environment, wherein the second communication protocol is not supported by the instance of the server application; and
   in response to intercepting the communications, forwarding, by the application router, the intercepted communications from the instance of the server application to the gateway using the second communication protocol and the intercepted communications from the gateway to the instance of the server application using the first communication protocol.

18. The one or more non-transitory computer-readable storage media of claim 17, the operations further comprising:
   based on determining, by the application router, that an available instance of the server application is already executing in the distributed computing environment, employing the available instance of the server application for communications with the client application.

19. The one or more non-transitory computer-readable storage media of claim 17, wherein the second communication protocol is an application layer protocol, and the first communication protocol is not an application layer protocol.

20. The one or more non-transitory computer-readable storage media of claim 17, wherein the application router forwards the communications based on routing information which associates the client application with the instance of the server application.

* * * * *